(12) United States Patent
Song et al.

(10) Patent No.: US 10,816,021 B2
(45) Date of Patent: Oct. 27, 2020

(54) ASSEMBLY METHOD OF INNER RING THREADED-CONNECTION COMPONENT DEVICE OF WIND-POWER LOCKING PLATE

(71) Applicant: Luoyang Haozhi Mechanical Co., Ltd., Luoyang, Henan (CN)

(72) Inventors: Guozhi Song, Henan (CN); Longxiang Yan, Henan (CN)

(73) Assignee: Luoyang Haozhi Mechanical Co., Ltd., Luoyang (CN)

( * ) Notice: Subject to any disclaimer, the term of this patent is extended or adjusted under 35 U.S.C. 154(b) by 1 day.

(21) Appl. No.: 16/344,863

(22) PCT Filed: Feb. 24, 2017

(86) PCT No.: PCT/CN2017/074754
§ 371 (c)(1),
(2) Date: Apr. 25, 2019

(87) PCT Pub. No.: WO2018/152765
PCT Pub. Date: Aug. 30, 2018

(65) Prior Publication Data
US 2020/0056641 A1 Feb. 20, 2020

(30) Foreign Application Priority Data
Feb. 24, 2017 (CN) .............. 2017 1 010872

(51) Int. Cl.
*F16B 5/02* (2006.01)
*F03D 80/00* (2016.01)
(Continued)

(52) U.S. Cl.
CPC ............... *F16B 5/02* (2013.01); *F03D 80/00* (2016.05); *F03D 80/88* (2016.05); *F16B 7/02* (2013.01);
(Continued)

(58) Field of Classification Search
CPC ..... F16B 5/02; F16B 7/02; F16B 7/025; F03D 80/00; F03D 80/88; B23P 19/10;
(Continued)

(56) References Cited

FOREIGN PATENT DOCUMENTS

DE 4238665 A1 * 5/1994 ............. F16D 1/096
DE 4238665 A1 5/1994
(Continued)

*Primary Examiner* — Jermie E Cozart
(74) *Attorney, Agent, or Firm* — Bay State IP, LLC

(57) ABSTRACT

The disclosure provides an assembly method of inner ring threaded-connection component device of wind-power locking plate. An internal thread (5) is processed in an inner hole of an inner ring flange (2), an external thread (4) is processed on an outer conical surface (8) at an large opening end of an inner ring (3), and after the processing of the internal thread (5) and the processing of the external thread (4) are respectively completed, an inner ring assembly formed by integral threaded connection of the inner ring flange (2) and the inner ring (3) is connected with the outer ring (1) through bolts so as to form a locking plate component; a shaft sleeve (9) sleeves the locking plate component to ensure that the inner hole of the inner ring (3) matches with the outer circumference of the shaft sleeve (9).

3 Claims, 5 Drawing Sheets

(51) Int. Cl.
    *F16B 7/02*     (2006.01)
    *F16L 15/02*    (2006.01)
    *F16L 15/08*    (2006.01)
    *F03D 80/80*    (2016.01)
    *F16L 15/00*    (2006.01)
    *F16L 15/04*    (2006.01)
    *B23P 19/12*    (2006.01)
    *B23P 19/10*    (2006.01)

(52) U.S. Cl.
    CPC .............. *F16B 7/025* (2013.01); *F16L 15/00* (2013.01); *F16L 15/02* (2013.01); *F16L 15/04* (2013.01); *F16L 15/08* (2013.01); *B23P 19/10* (2013.01); *B23P 19/12* (2013.01); *F16L 15/001* (2013.01)

(58) Field of Classification Search
    CPC ......... B23P 19/12; F16L 15/00; F16L 15/001; F16L 15/02; F16L 15/04; F16L 15/08
    See application file for complete search history.

(56) References Cited

FOREIGN PATENT DOCUMENTS

| | | | |
|---|---|---|---|
| DE | 10315534 A1 * | 10/2004 | ............. F16D 1/095 |
| WO | 9846897 A1 | 10/1998 | |
| WO | WO-9846897 A1 * | 10/1998 | ............. F16D 1/094 |

\* cited by examiner

ASSEMBLY METHOD OF INNER RING THREADED-CONNECTION COMPONENT DEVICE OF WIND-POWER LOCKING PLATE

CROSS REFERENCE TO RELATED APPLICATION

This application is for entry into the U.S. National Phase under § 371 for International Application No. PCT/CN2017/074754 having an international filing date of Feb. 24, 2017, and from which priority is claimed under all applicable sections of Title 35 of the United States Code including, but not limited to, Sections 120, 363, and 365(c), and which in turn claims priority under 35 USC 119 to Chinese Patent Application No. 20171010872.0 filed on Feb. 24, 2017.

TECHNICAL FIELD

The disclosure relates to an assembly method of an inner ring device of a locking plate for a transmission shaft, and in particular relates to an assembly method of inner ring threaded-connection component device of wind-power locking plate.

BACKGROUND

Currently, a locking plate for a wind turbine generator set is mainly composed of an inner ring, an outer ring and bolts. A step and an inner circular conical surface are fabricated on an inner hole of the outer ring, and threaded holes are uniformly distributed on the step. A flange and an outer circular conical surface are fabricated on the outer circumference of the inner ring, and screw through holes, the number of which is equal to the number of the threaded holes on the step of the outer ring, is fabricated in the flange. The flange and the outer circular conical surface of the inner ring and the step and the inner circular conical surface of the outer ring match with each other and are assembled together. In the wind turbine generator set mounting process, the locking plate sleeves a shaft sleeve, a spindle is inserted into an inner hole of the bearing bush, and the locking plate is locked by a fastening bolt. The diameter of the spindle of the wind turbine generator set is large, and the volume and the weight of the spindle are greater, so the spindle is a large accessory. Due to the characteristics of the structure and the shape of the inner ring, during processing, the blank of the inner ring is processed by utilizing steel, the outer diameter of which is larger than that of the flange, and the weight of the processed product only is about 20% of the weight of the blank, so the steel is immensely wasted, the proportion of the disposable materials during processing is high, and the processing time is long, resulting in economical burden on the enterprise. In view of the above reasons, an assembly method of inner ring threaded-connection component device of wind-power locking plate is provided.

SUMMARY

An objective of the present disclosure is to provide an assembly method of inner ring threaded-connection component device of wind-power locking plate based on a reasonable design in order to overcome the problems that the blank of the current wind-power locking plate inner ring is processed by utilizing steel, the outer diameter of which is larger than that of a flange, and the weight of the processed product only is about 20% of the weight of the blank, so the steel is immensely wasted, the proportion of the disposable materials during processing is high, the processing time is long, resulting in economical burden on the enterprise. The assembly method of inner ring threaded-connection component device of wind-power locking plate, provided by the present disclosure, is applicable to keyless connection of large-medium shafts, an inner ring and the flange are respectively processed in a matching manner, an internal thread is processed in a flange hole, an external thread is processed on the outer side of the inner ring, and the inner ring and the flange are connected by threaded connection of the internal thread and the external thread, so, the structure is simple, the mounting is convenient, the production quality is guaranteed, meanwhile, more than 60% of the steel can be saved and more than 70% of production costs can be reduced, energy conservation and environment protection are achieved, economic benefits are largely improved, and safety in production and use is guaranteed.

In order to achieve the above objective, the present disclosure adopts the following technical scheme: an assembly method of inner ring threaded-connection component device of wind-power locking plate is provided, wherein an inner ring threaded-connection component device of a wind-power locking plate comprises an outer ring, an inner ring flange, an inner ring, an external thread, an internal thread, a spindle, thread through holes, an outer conical surface, a shaft sleeve and a flange groove; the inner ring is arranged in the outer ring, the shaft sleeve is arranged in the inner ring, and the spindle is arranged in the shaft sleeve; the inner ring flange is arranged on the outer side of the end part of the inner ring, and threaded-connection screw threads are arranged between the inner ring flange and the inner ring; the outer side of the inner ring is set to be a conical body, and the external thread is arranged at one end of the outer conical surface of the inner ring; and the internal thread is arranged on a shaft hole wall of the inner ring flange and is correspondingly in threaded connection with the external thread.

An inner conical hole is reserved in the outer ring, the flange groove is reserved in an opening of the inner conical hole, the inner ring is arranged in the inner conical hole, the inner conical hole is arranged corresponding to the outer conical surface, and the inner ring flange is arranged in the flange groove; and the thread through holes are reserved in the flange groove corresponding to the inner ring flange, and bolts are arranged in the thread through holes.

Before the inner ring flange and the inner ring are assembled, the internal thread is processed in an inner hole of the inner ring flange, the external thread is processed on the outer conical surface at an large opening end of the inner ring, and after the processing of the internal thread and the processing of the external thread are respectively completed, the inner ring and the inner ring flange form an inner ring component through the threaded connection of the external thread and the internal thread; and then the inner ring component is mounted in the inner conical hole of the outer ring, the thread through holes are regulated to correspond to threaded holes of the flange groove, bolts penetrate through the thread through holes and rotate, and the inner ring component is connected with the outer ring through the bolts; and an inner ring assembly formed by integral threaded connection of the inner ring flange and the inner ring is connected with the outer ring through bolts so as to form a locking plate component.

The shaft sleeve sleeves the locking plate component to ensure that the inner hole of the inner ring matches with the outer circumference of the shaft sleeve, and then the spindle penetrates through the shaft sleeve and is regulated to a mounting position.

After location of the shaft sleeve and the spindle is completed, a fastening bolt rotates, at this time, the fastening bolt pushes the inner ring flange so that the inner ring enters the inner conical hole of the outer ring, simultaneously the outer conical surface of the inner ring shrinks internally under the extrusion of the inner conical hole of the outer ring, the inner ring shrinks in order to transfer the pressure to enable that the shaft sleeve shrinks, and the shaft sleeve gradually shrinks so as to lock the spindle; and the fastening bolt pushes the inner ring flange till the end face of the inner ring flange is in butt joint with the flange groove, and then assembling and locking of the shaft sleeve and the spindle of the wind-power locking plate are completed.

The present disclosure has the following beneficial effects: the assembly method of inner ring threaded-connection component device of wind-power locking plate, provided by the present disclosure, is applicable to the keyless connection of the large-medium shafts, the inner ring and the flange are respectively processed in the matching manner, the internal thread is processed in the flange hole, the external thread is processed on the outer side of the inner ring, and the inner ring and the flange are connected through the threaded connection of the internal thread and the external thread, so, the structure is simple, the mounting is convenient, the production quality is guaranteed, meanwhile, more than 60% of the steel can be saved and more than 70% of production costs can be reduced, energy conservation and environment protection are achieved, economic benefits are largely improved, and safety in production and use is guaranteed.

BRIEF DESCRIPTION OF THE DRAWINGS

The following further describes the present disclosure in conjunction with accompanying drawings.

In FIG. 1, FIG. 2, FIG. 3, FIG. 4 and FIG. 5: 1—outer ring; 2—inner ring flange; 3—inner ring; 4—external thread; 5—internal thread; 6—spindle; 7—thread through hole; 8—outer conical surface; 9—shaft sleeve; and 10—flange groove.

DESCRIPTION OF THE EMBODIMENTS

Figure 1:
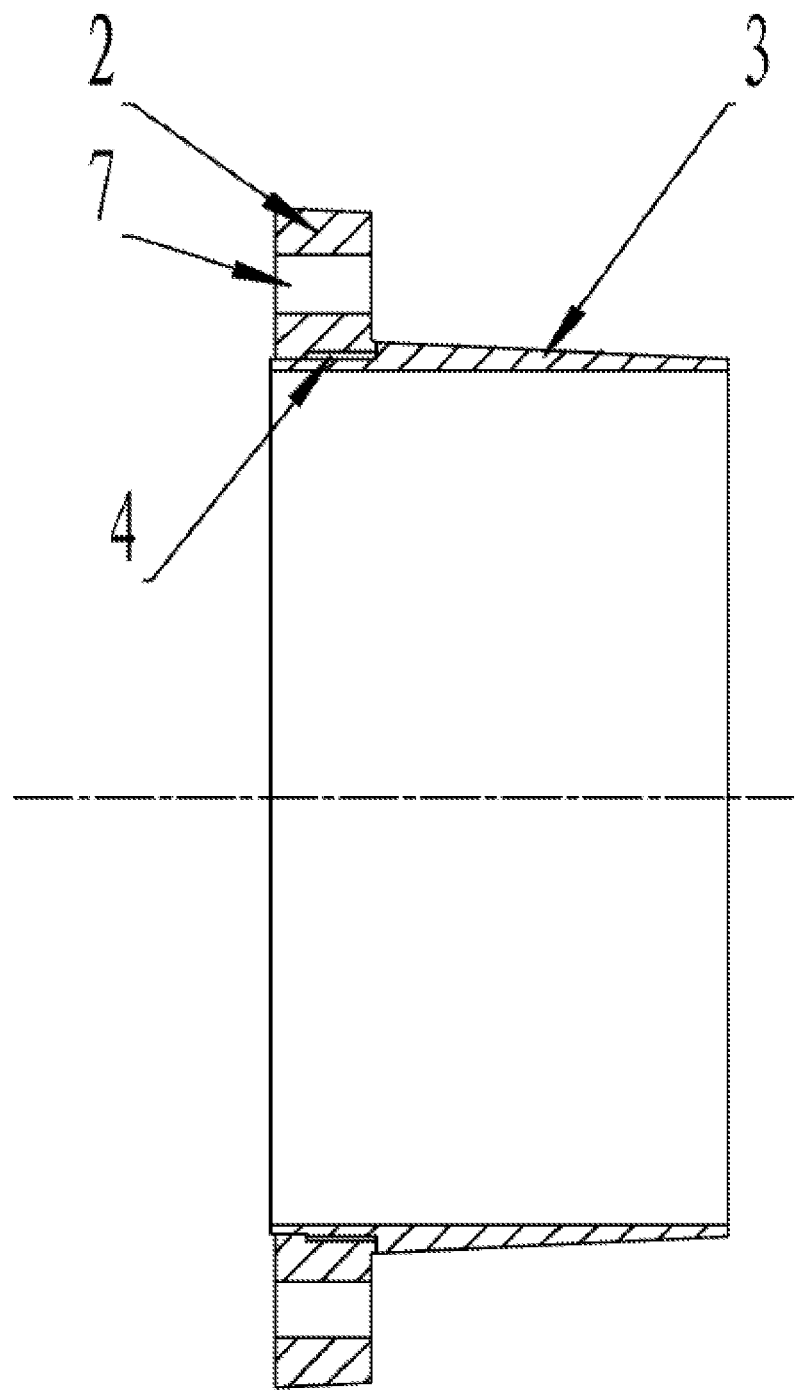
FIG. 1 is a structural schematic diagram of an inner ring.
Figure 2:
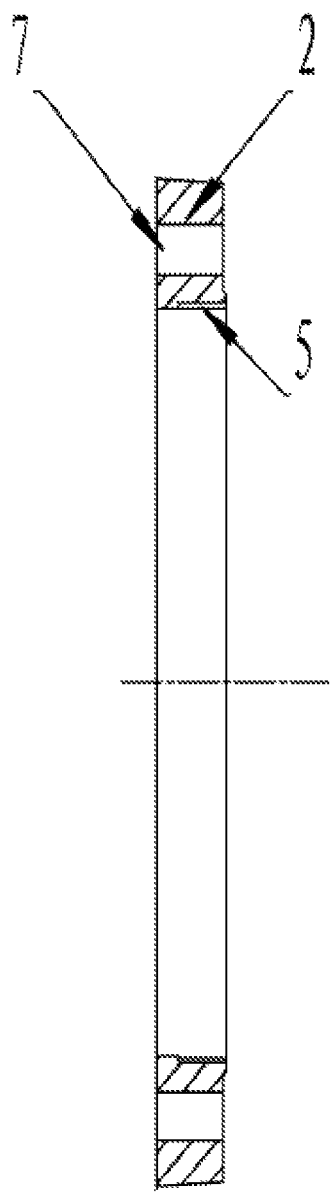
FIG. 2 is a schematic diagram of a local structure of FIG. 1.
Figure 3:
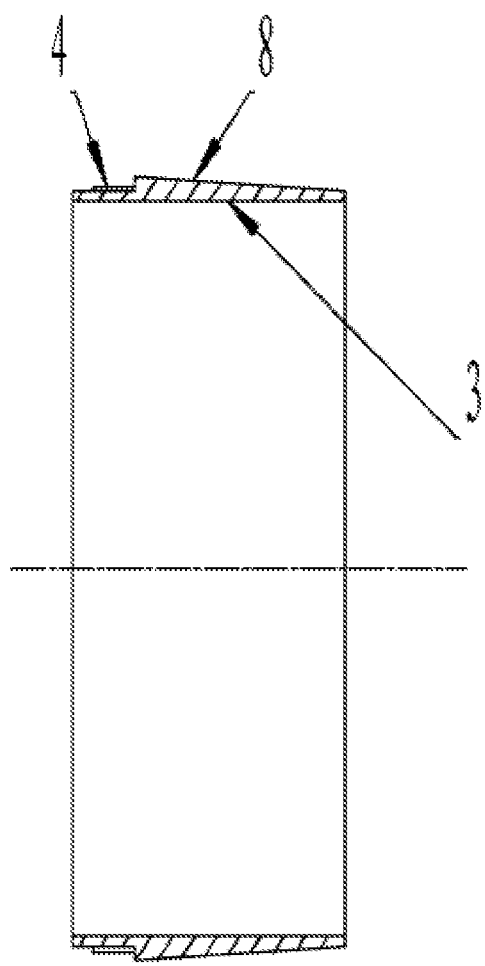
FIG. 3 is a schematic diagram of another local structure of FIG. 1.
Figure 4:
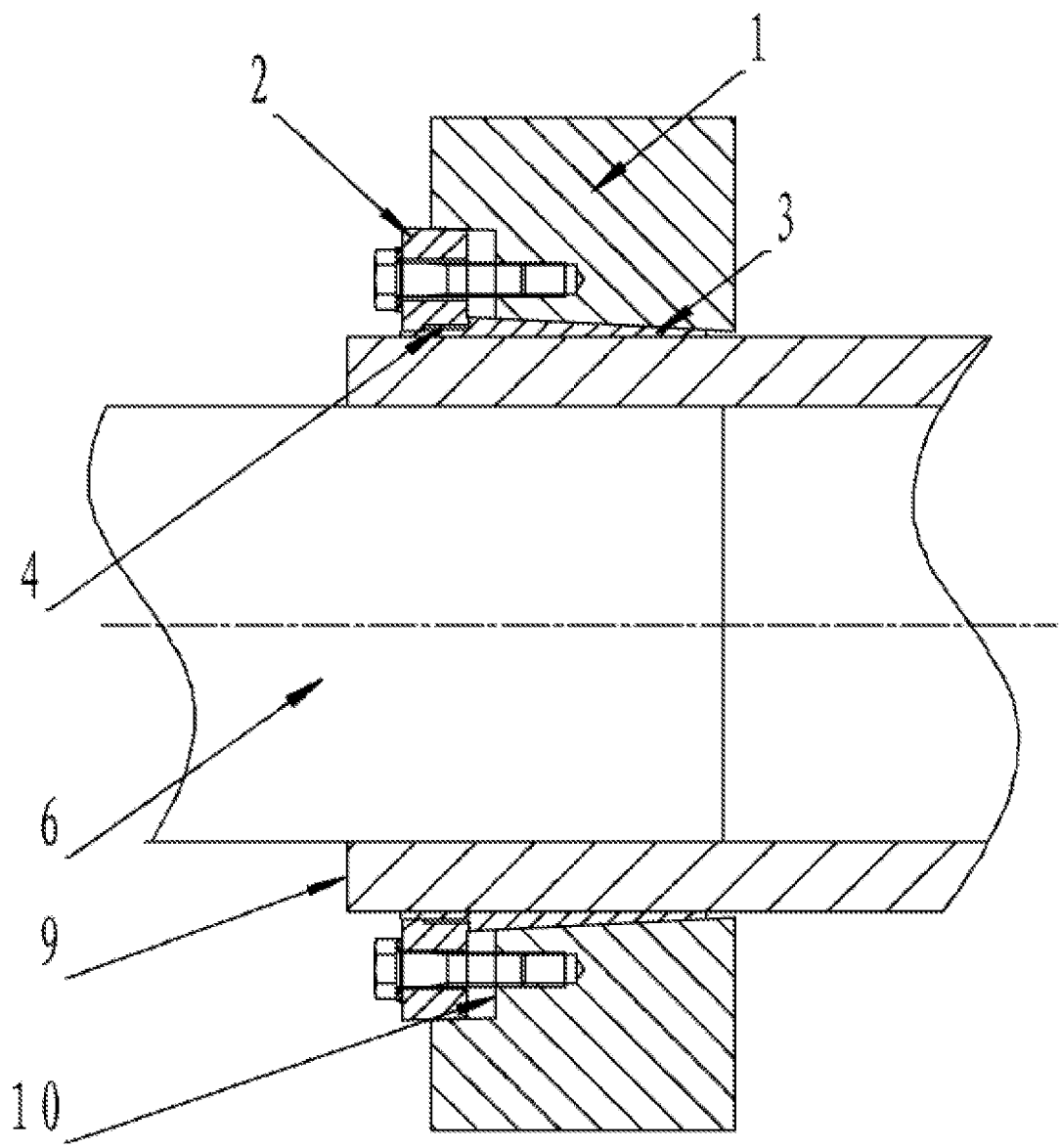
FIG. 4 is a structural schematic diagram of a final assembly.
Figure 5:
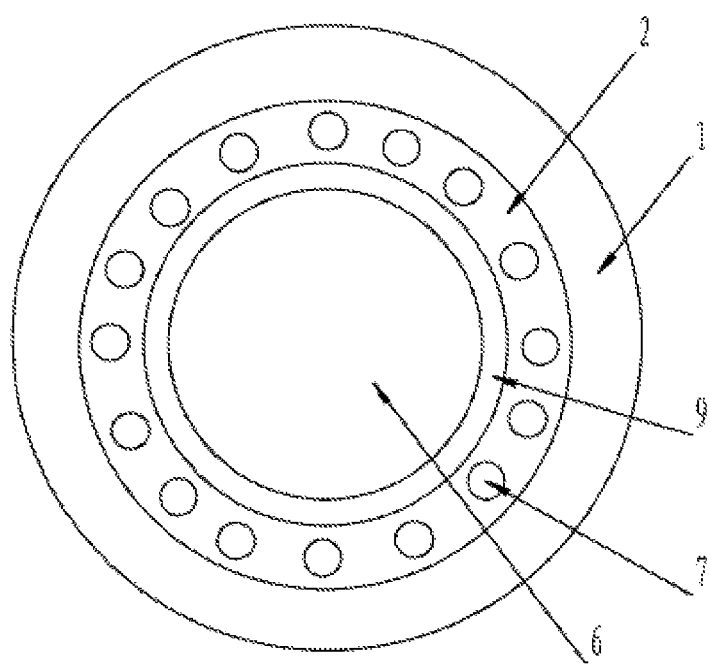
FIG. 5 is a structural schematic diagram of a cross section of FIG. 4.

The following further describes the present disclosure in detail in conjunction with embodiments and specific implementation manners.

Embodiment 1

An inner ring 3 is arranged in an outer ring 1, a shaft sleeve 9 is arranged in the inner ring 3, and a spindle 6 is arranged in the shaft sleeve 9. An inner ring flange 2 is arranged on the outer side of the end part of the inner ring 3, and threaded-connection screw threads are arranged between the inner ring flange 2 and the inner ring 3; the outer side of the inner ring 3 is set to be a conical body, and an external thread 4 is arranged at one end of an outer conical surface 8 of the inner ring 3; and an internal thread 5 is arranged on a shaft hole wall of the inner ring flange 2 and is correspondingly in threaded connection with the external thread 4.

An inner conical hole is reserved in the outer ring 1, a flange groove 10 is reserved in an opening of the inner conical hole, the inner ring 3 is arranged in the inner conical hole, the inner conical hole is arranged corresponding to the outer conical surface 8, and the inner ring flange 2 is arranged in the flange groove 10; and thread through holes 7 are reserved in the flange groove 10 corresponding to the inner ring flange 2, and bolts are arranged in the thread through holes 7.

Before the inner ring flange 2 and the inner ring 3 are assembled, the internal thread 5 is processed in an inner hole of the inner ring flange 2, the external thread 4 is processed on the outer conical surface 8 at an large opening end of the inner ring 3, and after the processing of the internal thread 5 and the processing of the external thread 4 are respectively completed, the inner ring 3 and the inner ring flange 2 form an inner ring component through the threaded connection of the external thread 4 and the internal thread 5; and then the inner ring component is mounted in the inner conical hole of the outer ring 1, the thread through holes 7 are regulated to correspond to threaded holes of the flange groove 10, bolts penetrate through the thread through holes 7 and rotate, and the inner ring component is connected with the outer ring 1 through the bolts; and the inner ring assembly formed by integral threaded connection of the inner ring flange 2 and the inner ring 3 is connected with the outer ring 1 through the bolts so as to form a locking plate component.

Embodiment 2

The shaft sleeve 9 sleeves the locking plate component to ensure that the inner hole of the inner ring 3 matches with the outer circumference of the shaft sleeve 9, and then the spindle 6 penetrates through the shaft sleeve 9 and is regulated to its mounting position.

Embodiment 3

After location of the shaft sleeve 9 and the spindle 6 is completed, a fastening bolt rotates, at this time, the fastening bolt pushes the inner ring flange 2 so that the inner ring 3 enters the inner conical hole of the outer ring 1, simultaneously the outer conical surface 8 of the inner ring 3 shrinks internally under the extrusion of the inner conical hole of the outer ring 1, the inner ring 3 shrinks in order to transfer the pressure to enable that the shaft sleeve 9 shrinks, and the shaft sleeve 9 gradually shrinks so as to lock the spindle 6. The fastening bolt pushes the inner ring flange 2 till the end face of the inner ring flange 2 is in butt joint with the flange groove 10, and then assembling and locking of the shaft sleeve 9 and the spindle 6 of the wind-power locking plate are completed.

What is claimed is:

1. An assembly method of inner ring threaded-connection component device of wind-power locking plate, wherein an inner ring threaded-connection component device of a wind-power locking plate comprises an outer ring (1), an inner ring flange (2), an inner ring (3), an external thread (4), an internal thread (5), a spindle (6), thread through holes (7), an outer conical surface (8), a shaft sleeve (9) and a flange groove (10); characterized in that: the inner ring (3) is arranged in the outer ring (1), the shaft sleeve (9) is arranged in the inner ring (3), and the spindle (6) is arranged in the shaft sleeve (9); the inner ring flange (2) is arranged on the outer side of the end part of the inner ring (3), and threaded-connection screw threads are arranged between the inner ring flange (2) and the inner ring (3); the outer side of the inner ring (3) is set to be a conical body, and the external thread (4) is arranged at one end of the outer conical surface (8) of the inner ring (3); and the internal thread (5) is arranged on a shaft hole wall of the inner ring flange (2) and is correspondingly in threaded connection with the external thread (4);

an inner conical hole is reserved in the outer ring (1), the flange groove (10) is reserved in an opening of the inner conical hole, the inner ring (3) is arranged in the inner conical hole, the inner conical hole is arranged corresponding to the outer conical surface (8), and the inner ring flange (2) is arranged in the flange groove (10); and the thread through holes (7) are reserved in the flange groove (10) corresponding to the inner ring flange (2), and bolts are arranged in the thread through holes (7);

before the inner ring flange (2) and the inner ring (3) are assembled, the internal thread (5) is processed in an inner hole of the inner ring flange (2), the external thread (4) is processed on the outer conical surface (8) at an large opening end of the inner ring (3), and after the processing of the internal thread (5) and the processing of the external thread (4) are respectively completed, the inner ring (3) and the inner ring flange (2) form an inner ring component through the threaded connection of the external thread (4) and the internal thread (5); and then the inner ring component is mounted in the inner conical hole of the outer ring (1), the thread through holes (7) are regulated to correspond to threaded holes of the flange groove (10), bolts penetrate through the thread through holes (7) and rotate, and the inner ring component is connected with the outer ring (1) through the bolts; and the inner ring assembly formed by integral threaded connection of the inner ring flange (2) and the inner ring (3) is connected with the outer ring (1) through bolts so as to form a locking plate component.

2. The assembly method of inner ring threaded-connection component device of wind-power locking plate according to claim 1, characterized in that: the shaft sleeve (9) sleeves the locking plate component to ensure that the inner hole of the inner ring (3) matches with the outer circumference of the shaft sleeve (9), and then the spindle (6) penetrates through the shaft sleeve (9) and is regulated to a mounting position.

3. The assembly method of inner ring threaded-connection component device of wind-power locking plate according to claim 1, characterized in that: after location of the shaft sleeve (9) and the spindle (6) is completed, a fastening bolt rotates, at this time, the fastening bolt pushes the inner ring flange (2) so that the inner ring (3) enters the inner conical hole of the outer ring (1), simultaneously the outer conical surface (8) of the inner ring (3) shrinks internally under the extrusion of the inner conical hole of the outer ring (1), the inner ring (3) shrinks in order to transfer the pressure to enable that the shaft sleeve (9) shrinks, and the shaft sleeve (9) gradually shrinks so as to lock the spindle (6); and the fastening bolt pushes the inner ring flange (2) till the end face of the inner ring flange (2) is in butt joint with the flange groove (10), and then assembling and locking of the shaft sleeve (9) and the spindle (6) of the wind-power locking plate are completed.

\* \* \* \* \*